United States Patent [19]

McKee

[11] Patent Number: 4,615,353
[45] Date of Patent: Oct. 7, 1986

[54] PNEUMATIC CONTROL VALVES WITH DIAPHRAGM ACTUATORS AND MODULAR BODY STRUCTURE

[76] Inventor: James E. McKee, P.O. Box 470544, 7207 Envoy Ct., Dallas, Tex. 75247

[21] Appl. No.: 574,278

[22] Filed: Jan. 26, 1984

[51] Int. Cl.$^4$ ............................................. F16K 11/04
[52] U.S. Cl. ..................................... 137/102; 92/97; 137/625.27; 137/625.66; 251/61.2; 251/61.3
[58] Field of Search ............... 137/102, 625.6, 625.66, 137/625.27; 251/61.3; 92/49, 97; 251/61.2

[56] References Cited

U.S. PATENT DOCUMENTS

| | | | |
|---|---|---|---|
| 3,731,905 | 5/1973 | Piet | 137/625.27 X |
| 3,776,510 | 12/1973 | Beck | 137/625.27 X |
| 3,789,880 | 2/1974 | Armstrong et al. | 137/625.3 |
| 3,794,075 | 2/1974 | Stoll et al. | 137/625.66 |
| 3,807,448 | 4/1974 | Hadden | 251/61.2 X |
| 3,958,495 | 5/1976 | Bernhoft | 137/625.66 X |
| 3,977,438 | 8/1976 | Muchow et al. | 137/625.66 |
| 4,105,047 | 8/1978 | Smallwood | 137/625.27 X |
| 4,212,320 | 7/1980 | Stoll et al. | 137/625.66 X |
| 4,276,897 | 7/1981 | Griswold | 137/107 X |
| 4,483,508 | 11/1984 | Marsh et al. | 251/61.3 |

FOREIGN PATENT DOCUMENTS

| | | | |
|---|---|---|---|
| 2227778 | 12/1973 | Fed. Rep. of Germany | 137/625.6 |
| 2832967 | 2/1980 | Fed. Rep. of Germany | 137/625.66 |
| 1224241 | 3/1971 | United Kingdom | 137/625.27 |

Primary Examiner—Gerald A. Michalsky
Attorney, Agent, or Firm—Hubbard, Thurman, Turner & Tucker

[57] ABSTRACT

Pressure fluid control valves include modular body structures made up of a plurality of end to end connected body parts which are preferably finish fabricated by injection molding of thermoplastic. An axially movable closure member is supported in coaxial bores formed in the assembled body parts and is characterized by a cylindrical plug engageable with opposed conical seat surfaces on adjacent body parts or spaced apart closure disks engageable with respective seat surfaces on a common body part to form a fluid-tight seal between inlet and exhaust ports and a working fluid transfer port, respectively. The closure plug or disks are molded of relatively soft plastic such as polyurethane and the closure plug may be molded directly on the closure member shaft. The shaft is supported by a differential area flexible rolling diaphragm or resilient sealed piston pilot actuator at one end and a mechanical actuator such as coil spring or other types of mechanism at the opposite end. The rolling diaphragm type pilot actuator provides for particularly low friction, fast response shifting of the closure member. The valve may be constructed in two and three way configurations and with various combinations of valve actuators.

22 Claims, 8 Drawing Figures

PNEUMATIC CONTROL VALVES WITH DIAPHRAGM ACTUATORS AND MODULAR BODY STRUCTURE

BACKGROUND OF THE INVENTION

1. Field of the Invention

The present invention pertains to pressure fluid control valves comprising generally cylindrical, axially movable closure members which are supported within a modular valve body by a flexible rolling diaphragm type pressure fluid pilot actuator and a coil biasing spring for rapid, low friction movement between control positions.

2. Background

In the art of pressure fluid control circuits, particularly pneumatic control or so-called logic circuits, it is especially desirable to utilize control valves having closure members which are of low mass, and move relatively free of frictional forces acting thereon so that the valve itself is not a variable in certain control functions.

Another important aspect of pneumatic and hydraulic control valves pertains to the provision of a valve wherein the closure member will form a substantially fluid-tight seal in selected positions to control the flow of fluid through the valve. Zero leakage type control valves are difficult and expensive to manufacture and typically so-called spool type control valves require the provision of separate resilient seal members supported on the valve closure member to perform the sealing function when engaged with a valve seat.

The myriad uses of pneumatic and hydraulic valves in various control circuits also contributes to the significance of providing a valve structure which is economical to manufacture in large quantities and is preferably of modular construction so that various specific valve configurations and functional requirements may be met my interchanging a relatively few number of parts in a particular valve assembly to change the operational characteristics of the valve. Although a great number of different valve designs have been developed in the art of fluid control valves of the type used for pneumatic and hydraulic logic circuits, there has been a need to improve the valve structure to meet the desiderata discussed above as well as to overcome certain other problems in the art of pneumatic and hydraulic control valves. The present invention provides several improvements in valves of the type particularly adapted for pneumatic logic and other types of control circuits as will be appreciated by those skilled in the art upon reading the following.

SUMMARY OF THE INVENTION

The present invention pertains to an improved pressure fluid control valve of a type including a closure member which is axially shiftable between opposed seat surfaces in a body member to selectively interconnect flow passages in the valve body which lead to and from a working component or another control valve.

In accordance with one aspect of the present invention there is provided a pneumatic control valve having a generally cylindrical plug of disk type closure member supported by a shaft which is axially shiftable within a valve body assembly between opposed seat surfaces to selectively interconnect flow passages formed in the valve. The closure member shaft is operably connected to actuating means which may comprise a pilot pressure fluid type actuator and/or mechanical actuator means comprising a coil spring for constantly urging the valve in a selected position.

In accordance with another aspect of the present invention there is provided a pneumatic or hydraulic control valve wherein the valve has an axially movable closure member which is of low mass and is operable to move with minimal frictional forces acting thereon whereby the valve is particularly responsive to a control signal or a mechanical actuating force to move from one position to another. The valve closure member comprises a molded plastic shaft and a molded plastic plug portion encapsulating a portion of the shaft and preferably formed of a resilient material which is suitable for providing fluid-tight sealing engagement with a seat surface on the valve. The relatively low inertia of the closure member increases the valve shifting speed between control positions.

The improved valve of the present invention is also provided with a unique differential area pilot pressure fluid actuator connected to the closure member shaft. The pilot actuator may include two flexible rolling diaphragms of differential projected area exposed to fluid pressure whereby the valve may be under the control of pressure fluid in a pilot pressure fluid chamber acting on the larger area diaphragm.

In accordance with a further aspect of the present invention the closure member is supported within the valve body substantially entirely by a flexible rolling diaphragm pilot pressure fluid actuator and by a mechanical actuator such as a compression type coil spring whereby minimal friction forces act on the closure member to retard or restrict its movement between control positions.

In accordance with another aspect of the present invention the folling diaphragm type pilot pressure fluid actuator is fabricated in a way such that separate flexible rolling diaphragms may be assembled to the closure member shaft and secured thereon by a forced wedging type fit utilizing a substantially rigid diaphragm support hub part which has conical recesses for receiving a cooperating conical shaped hub portion of one or both of the diaphragms.

The present invention also provides an improved control valve structure characterized by a modular valve body made up of several body parts which may be suitably secured together by threaded fasteners and the like and which are preferably fabricated from injection molded plastic in a finished as molded condition and not requiring machining operations prior to assembly of the body parts.

In accordance with still a further aspect of the present invention the cooperating modular body parts are provided with respective alignment pins and pin receiving holes, respectively, to assist in locating the body parts relative to each other during assembly and disassembly of a valve.

In one embodiment of an improved control valve of the present invention there is also provided a closure member having opposed spaced apart cylindrical closure disks which are engageable with opposed cooperating seat surfaces on a central body part and utilizing the features of the rolling diaphragm pilot pressure fluid actuator and spring actuator.

Those skilled in the art will appreciate from the foregoing and from the detailed description which follows that a wide variety of specific pneumatic and hydraulic control valves may be provided utilizing the superior aspects and features of the present invention.

BRIEF DESCRIPTION OF THE DRAWING

FIG. 5 is an exploded perspective view of portions of the valve illustrated in FIG. 4;

DETAILED DESCRIPTION OF THE PREFERRED EMBODIMENTS

Figure 1:
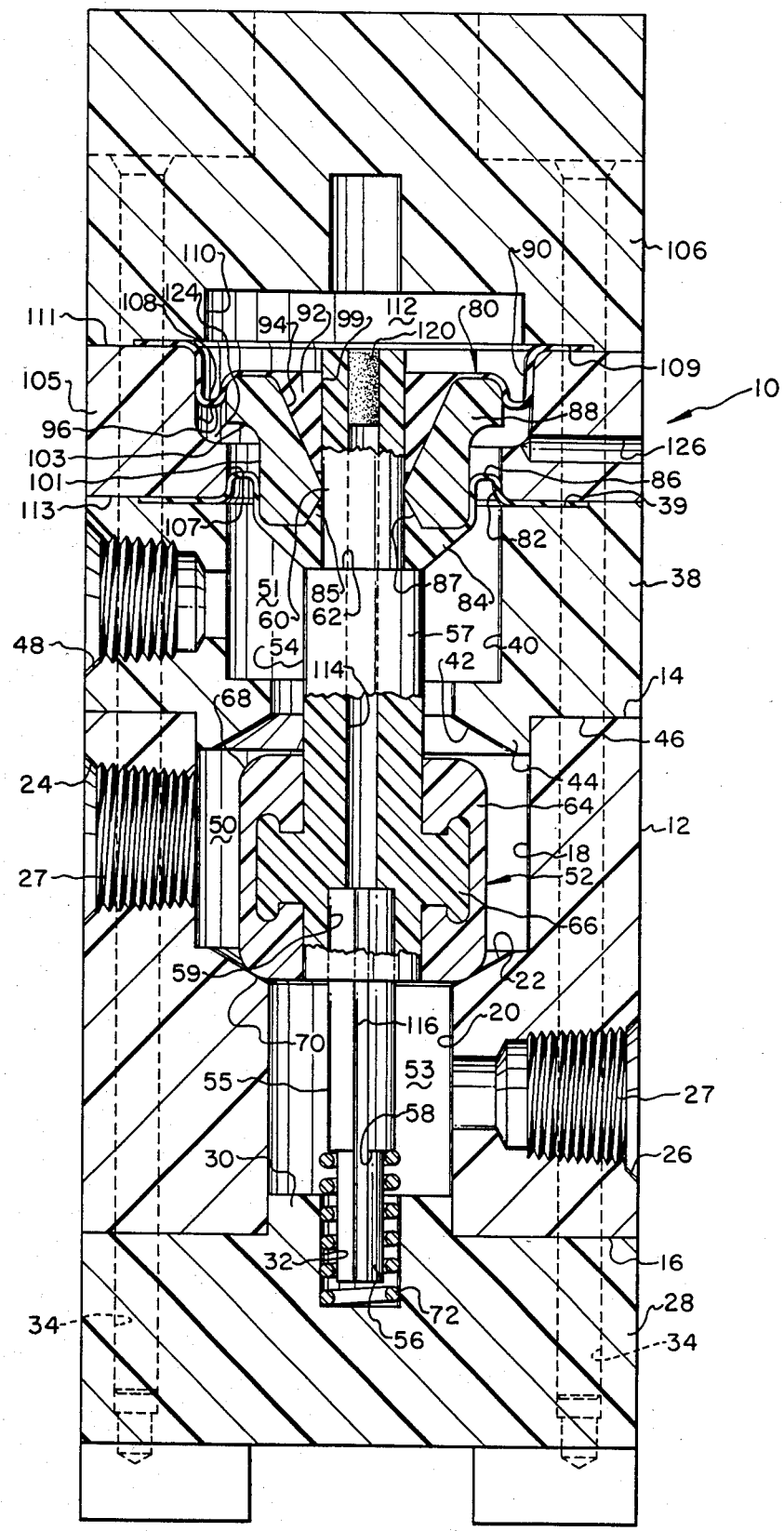
FIG. 1 is a longitudinal central section view of a pressure fluid control valve in accordance with the present invention.

In the description which follows like parts are marked throughout the specification and drawing with the same reference numerals, respectively.

Figure 2:
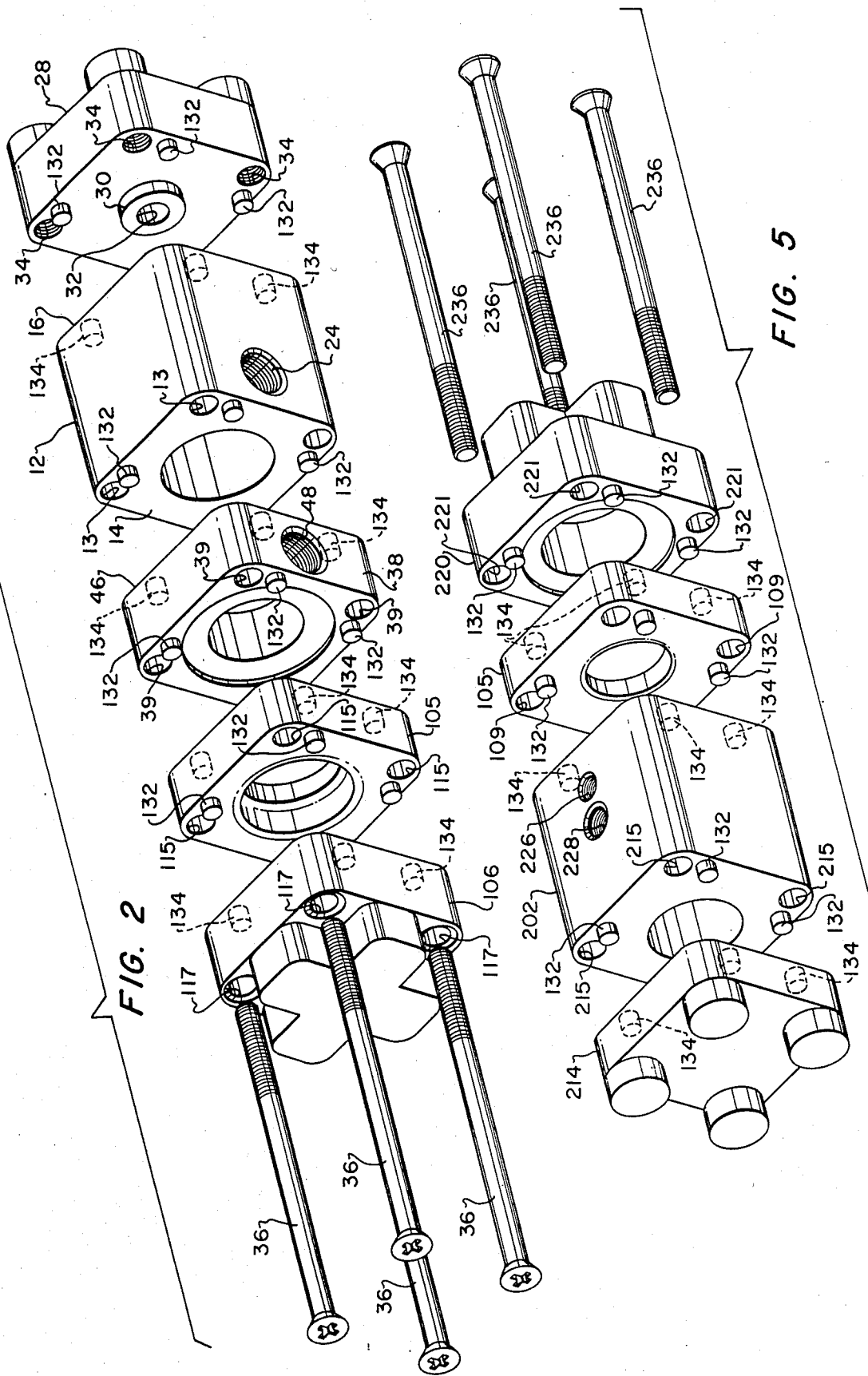
FIG. 2 is an exploded perspective view of portions of the valve illustrated in FIG. 1.

Referring to FIG. 1, in particular, there is illustrated a pneumatic control valve in accordance with the present invention, generally designated by the numeral 10. The control valve 10 includes a modular body structure comprising a central body part 12 of generally rectangular cross-sectional shape and having opposed end faces 14 and 16. The body part 12 is provided with an axially extending bore 18 opening to the end face 14 and a coaxial bore 20 of lesser diameter opening to the bore 18 and to the opposite end face 16. A generally frusto-conical seat surface 22 is formed between the bores 18 and 20. A first fluid port 24 opens into the bore 18 and a second port 26 opens into the bore 20. The ports 24 and 26 may be provided with suitable internal threads 27, as shown, for connecting the valve 10 to conventional conduit fittings or the like, not shown. The bore 20 is closed at one end by a cap or cover part 28 having a cylindrical boss 30 adapted to fit closely within the bore 20. The boss 30 includes a generally cylindrical recess 32 formed therein. The cover part 28 is preferably provided with a plurality of spaced apart tapped holes 34, for receiving cooperating threaded fasteners 36, as illustrated in FIG. 2, for retaining the body parts of the valve 10 in assembly.

The valve 10 is further characterized by a body part 38 having a stepped cylindrical bore 40 intersecting a frusto-conical seat surface 42. The seat surface 42 is also formed on a cylindrical boss portion 44 which is dimensioned to fit snugly within the bore 18 wherein the body part 38 is supported in assembly with the body part 12 across cooperating faces 14 and 46, respectively. The body part 38 includes a third internally threaded fluid port 48 opening into the bore 40 from a sidewall of the body part 38. The seat surfaces 22 and 42 are of similar configuration and are directly opposite each other within a chamber 50 defined by and between the seat surfaces.

The valve 10 is provided with a unique, axially movable closure member, generally designated by the numeral 52, and including an elongated shaft 54 having a separable reduced diameter part 55, forming a shoulder 58, and a second reduced diameter portion 60 forming a shoulder 62. The closure member 52 includes a generally cylindrical plug member 64, preferably formed of a relatively soft resilient plastic material, which is molded on a cylindrical core or hub 66 formed integral with the shaft 54. The closure plug 64 includes opposed curved end faces 68 and 70 which are engageable respectively with the seat surfaces 42 and 22 to form a fluid-tight seal between the chamber 50 and the ports 48, and 26, respectively.

The closure member 52 is biased toward engagement with the seat 42 by an actuator comprising a coil spring 72 journalled in the recess 32 and disposed around the reduced diameter shaft portion 56 and engaged with the shoulder 58. The valve 10 is also provided with a unique pilot pressure fluid actuator including diaphragm means for supporting the closure member 52 within the valve body structure. The pilot pressure fluid actuator is generally designated by the numeral 80 and comprises a first flexible cylindrical rolling diaphragm 82 having a hub portion 84 with a suitable bore formed therein for fitting the hub portion onto the reduced diameter shaft portion 60. The diaphragm 82 is preferably molded with an annular wall portion 86 having a generally U shaped configuration when viewed in longitudinal cross-section to permit axial movement of the closure member 52 with relatively little frictional resistance from the diaphragm 82. The diaphragm 82 is retained on the closure member shaft portion 60 by a hub member 88 and is secured in wedging engagement with the hub member by a conical diaphragm hub portion 85 which is fitted in a cooperating conical bore 87 in the hub member 88.

The hub member 88 is disposed on the shaft portion 60 and retained thereon by a second flexible rolling diaphragm, generally designated by the numeral 90. The diaphragm 90 has an integral molded hub portion 92 of a generally conical configuration and which is forcibly fitted in a conical bore or recess 94 formed in the hub member 88. The diaphragm 90 is also pre-molded with an annular generally U shaped wall portion 96 to permit axial movement of the closure member 52 with virtually no resistance from the diaphragm 90 due to its flexing. The configuration of the diaphragms 82 and 90 does not require elastic strectching of either of the diaphragms and hence further contributes to the low resistance to movement of the closure member 52. The diaphragm hub portion 92 is formed with a bore 99 which is preferably dimensioned to be a slight interference fit over the shaft portion 60 so that the diaphragm 90 is actually force fitted over the shaft and in wedging engagement with the hub member 88. The hub member 88 includes a stepped cylindrical outer surface 101 with a circumferential fillet 103 for supporting the rolling wall portion 86 of the diaphragm 82.

The diaphragms 82 and 90 are supported about their periphery by a body part 105 which is interposed between the body part 38 and a cover part 106. The body parts 38 and 106 may each have suitable shallow counterbores 39 and 109 formed in their respective transverse faces to receive the periphery of the diaphragms. Alternatively, the counterbores for receiving the diaphragms 82 and 90 could be formed in opposed faces 111 and 113 of the body part 105. The body part 105 includes a first cylindrical bore portion 107 and a second and larger diameter cylindrical bore portion 108. A bore 110 in the cover member 106, together with diaphragm 90, forms a pilot pressure fluid chamber 112. The difference in the axially projected areas of the diaphragms 82 and 90, delimited by the respective bores 107 and 108, provides for axial movement of the closure member 52 in a direction toward the actuator spring 72 under the urging of pressure fluid, even if the fluid pressures are equal in the chamber 51, formed by the bore 40, and the chamber 112. Pilot pressure fluid is admitted to the chamber 112 through a passage 114 formed in the shaft 54, which passage opens into the chamber 112 and into a chamber 53, formed by the bore 20, through a groove 116 formed in shaft part 55, 56.

The passage 114 is also provided with fluid flow restricting means comprising a plug 120 fitted in the end of the passage adjacent the chamber 112. The plug 120 is preferably formed of a porous media such as sintered metal of a predetermined density, for a given diameter and length of the plug 120, to provide for restricting flow of fluid in and out of the chamber 112 by way of the passage 114. The shaft 54 is preferably formed in two sections comprising a section 57 including the reduced diameter portion 60 and the core portion 66, and the second section 55, reduced diameter 56 which is press fitted into a bore 59 formed in the core portion 66. A chamber 124 formed between the diaphragms 82 and 90 is vented to atmosphere through a passage 126 to permit axial movement of the diaphragms without any increase or decrease of fluid pressure in the chamber 124.

Referring now to FIG. 2, it will be noted that the respective body parts 12, 38, 105 and 106 are each provided with respective clearance holes 13, 39, 115 and 117 for receiving the fasteners 36 although, as previously described, the body part 28 includes internal threaded portions 34 for engagement with the screw fasteners 36. The body parts 12, 38, and 105 are also each provided with cooperating alignment pins 132 and alignment holes 134 formed in opposite support faces of the respective body parts, as shown, for use in aligning the body parts with respect to each other when they are placed in assembly to form a valve structure such as the valve 10. The body parts 28 and 106 each require only pins 132 and holes 134, respectively. The body parts 12, 28, 38, 105 and 106 are also all preferably manufactured of injection molded plastic such an ABS type plastic or any plastic material which will be suitably compatible with the operating environment of the valve. No machining operations are required on the valve body parts save the possible requirement to provide internal threads in the ports 24, 26 and 48.

The closure member 52 may also be formed entirely of molded or fabricated plastic structures. The shaft 54 is preferably formed of relatively hard plastic which is then reinserted in a mold so that the closure member portion 64 may be molded around the core 66 using a suitable resilient plastic such as a polyurethane compound. The rolling diaphragms 82 and 90 are, of course, molded of a suitable flexible plastic such as a neoprene compound. Accordingly, the valve 10 requires virtually no finish machining operations unless provided with internal threads in the respective fluid ports as described hereinabove.

The valve 10 is typically used in a control circuit wherein the port 24 is connected to a working element such as an actuator or a second control valve in a circuit and wherein the port 26 is a pressure fluid supply or exhaust port and the port 48 is also a supply or exhaust port and is typically the opposite of the function of the port 26. For example, assuming that pressure fluid is supplied through the port 26 to the bore 20 the valve closure member 52 would normally be biased in a position with the closure member 52 in sealing engagement with the seat 42 to block communication of the port 24 with the port 48. However, upon introduction of pressure fluid into chamber 53 and chamber 50 and through port 24, assuming a typical resistance to fluid flow by means such as piston and cylinder type actuator, not shown, fluid pressure would increase in the chambers 50 and 53 to cause pressure fluid to flow to the chamber 112 in a restricted manner through the passage 114 and the flow restricting element 120. As pressure increases in the chamber 112 and acting on the diaphragm 90 the valve closure member 52, at a predetermined time, would shift from the position in engagement with the seat 42 to a position in engagement with the seat 22 to shut off fluid flow from the port 26 to the port 24 and to place the port 24 in communication with the port 48 to exhaust fluid from the aforementioned actuator, for example.

As long as pressure fluid at a sufficient supply pressure is present at port 26 the pilot pressure fluid actuator 80 will hold the closure member 52 in the position illustratd due to pressure fluid acting on the face of the diaphragm 90 exposed to the chamber 112. However, upon venting the chamber 53 pressure fluid can be vented from the chamber 112 through the flow restrictor 120 and the passage 114 to allow the spring 72 to position the closure member 52 to close off communication between the ports 24 and 48. Alternatively, of course, the chamber 112 could be connected to other passage means, not shown, for venting operations to control movement of the closure member 52.

Those skilled in the art will appreciate that various types of actuators may be used in conjunction with the valve 10. For example, the valve body structure can be modified to provide a pilot pressure fluid actuator at the end of the shaft 54 opposite the end at which the actuator 80 is disposed. The pilot pressure fluid supply may, of course, be introduced to the pilot pressure fluid actuator such as the actuator 80 through an external conduit, not shown, instead of internally through the shaft 54, although the provision of the passage means 114, 116 in the shaft 54 is a unique feature of the valve 10.

Figure 3:
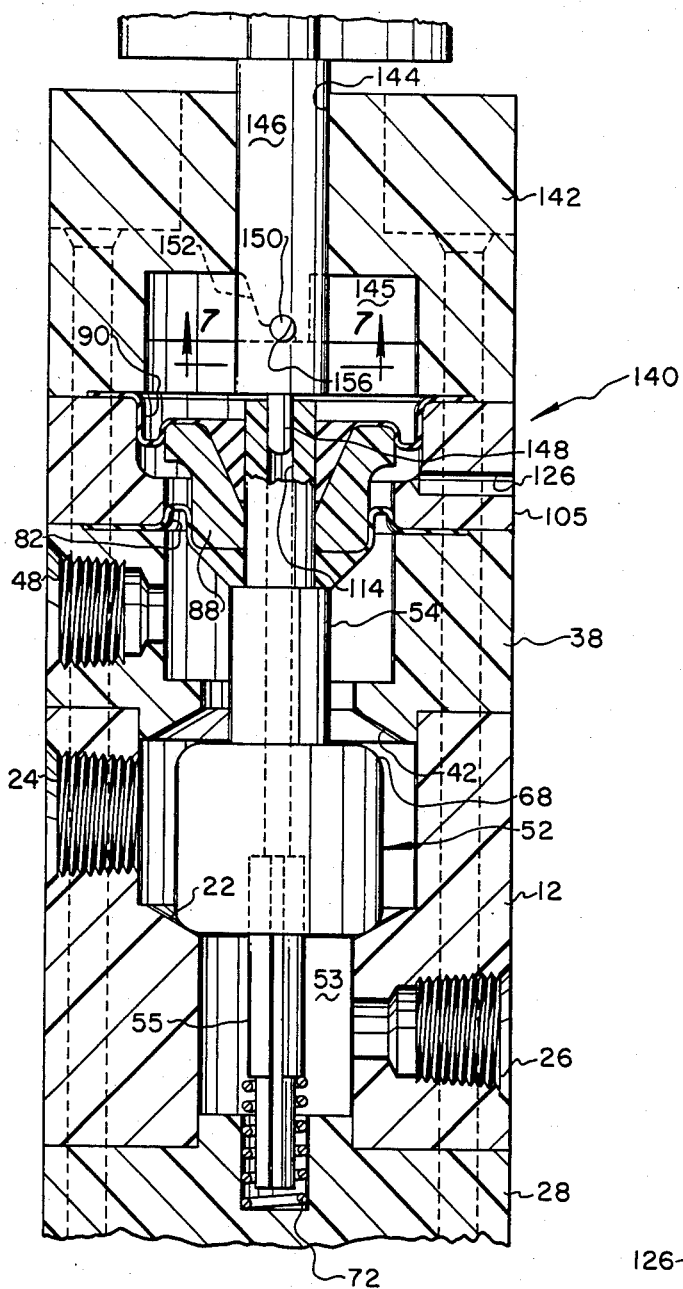
FIG. 3 is a section view of the valve of FIG. 1 modified to include a mechanical actuator.
Figure 7:
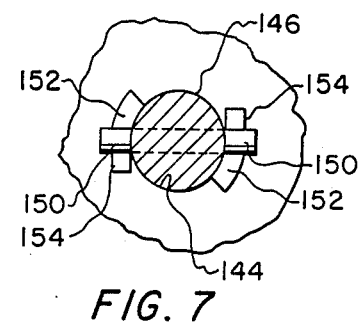
FIG. 7 is a section view taken along line 7—7 of FIG. 3.

Referring to FIGS. 3 and 7, for example, there is illustrated a modified arrangement of a valve in accordance with the present invention and generally designated by the numeral 140. The valve 140 is similar in many respects to the valve 10 and differs primarily in that the cover part 106 is replaced by a cover part 142 having a longitudinal bore 144 coaxial with the longitudinal axis of the closure member 52 and opening into a chamber 145. The bore 144 is operable to journal a rotary actuator shaft member 146 having a reduced diameter distal end 148 which is adapted to project into the passage 114 of the shaft 54 in place of the flow restrictor 120 and is rotatable relative to the shaft 54. Suitable plug means, not shown, should be provided in passage 114, to prevent leakage of fluid into chamber 145 from chamber 53. The rotary shaft 146 includes a laterally projecting pin type cam follower 150 which is engageable with opposed annular cam surfaces 152 formed on opposed collar portions 154 disposed around bore 144. In response to the rotation of the shaft 146 the cam follower 150 is operable to move out of opposed cam recesses 156, one shown in FIG. 3, and along cam surfaces 152. Thanks to the urging of the coil spring 72 at the opposite end of the shaft 54, the closure member 52 will move from the position shown in FIG. 3 to a position wherein the closure plug surface 68 will engage seat surface 42 when the shaft 146 is rotated to permit the cam follower 150 to move out of the recesses 156 and down along the cam surfaces 152.

Figure 6:
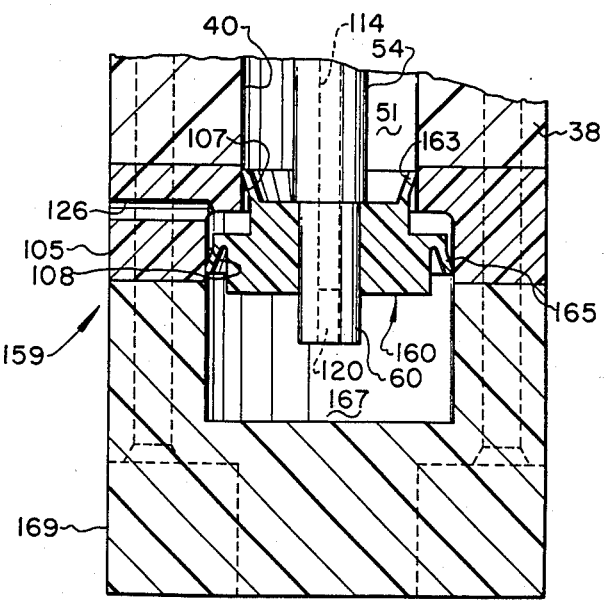
FIG. 6 is a detail section view of a differential area self sealing piston type pilot pressure fluid actuator for use with the valves of FIGS. 1 and 4.

In another version of the valve of the present invention shown in FIG. 6, a portion of a valve 159 is shown in an inverted position relative to the valves shown in FIGS. 1 and 3 and which is similar to valve 10 except the rolling diaphragms 82 and 90 have been replaced by a differential area piston 160. The piston 160 is mounted on and suitably secured to the shaft portion 60 in place of the hub member 88. The piston 160 includes spaced apart circumferential lip seal portions 163 and 165 which are slidably engageable with the walls of the body part 105 formed by the bores 107 and 108 to form a fluid-tight seal for chamber 51, defined by the bore 40, and a modified pilot fluid chamber 167 formed in cover part 169, respectively. In the valve 159 the body parts 38 and 105 can be formed integral with each other. Accordingly, the valve structure of the present invention may be modified provide actuators of various types including mechanical or pressure fluid actuators at both ends of the closure member 52 without substantially modifying the valve body or closure member and whereby a versatile arrangement of valves may be provided using a substantial number of common parts.

Figure 8:
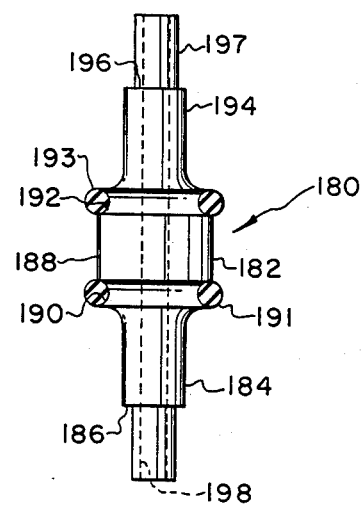
FIG. 8 is a detail elevation, partially sectioned, of an alternate embodiment of a closure member for the valve illustrated in FIG. 1.

Referring briefly to FIG. 8, an alternate embodiment of a closure member for use with the valves 10, 140 or 159 is illustrated and generally designated by the numeral 180. The closure member 180 includes an elongated shaft 182 similar in its overall configuration to the shaft 54 and having a first reduced diameter portion 184 formed with a transverse shoulder 186 for engagement with the end of the spring 72 in the same manner that the shaft 54 is engageable with the spring 72 in the valve embodiments illustrated in FIGS. 1 and 3. The shaft 183 includes a central portion 188 delimited by spaced apart circumferential grooves 190 and 192. A second reduced diameter shaft portion 194 extends from the central portion 188 opposite the reduced diameter portion 184 and forms a transverse shoulder 196 with a reduced diameter portion 197 for receiving the pilot actuators 80 or 160.

The closure member 180 includes resilient cylindrical ring members 191 and 193 which are, respectively, carried in the respective grooves 190 and 192 and form annular seat surfaces engageable with the respective valve seats 22 and 42 in place of the closure plug 64. The closure member 180 also includes an elongated passage 198 which extends through the shaft 182 from one end to the other for communicating pilot pressure fluid from valve chamber 53 to the pilot pressure fluid chamber 112 when the closure member 180 is used in place of the closure member 52, for example. With the arrangement of the closure member 180, any damage to the resilient closure member surfaces formed by the rings 191 and 193 may be easily repaired by interchanging the rings 191 and 193 with replacement rings. The resilient rings 191 and 193 may comprise conventional commercially available o-rings, for example.

Figure 4:
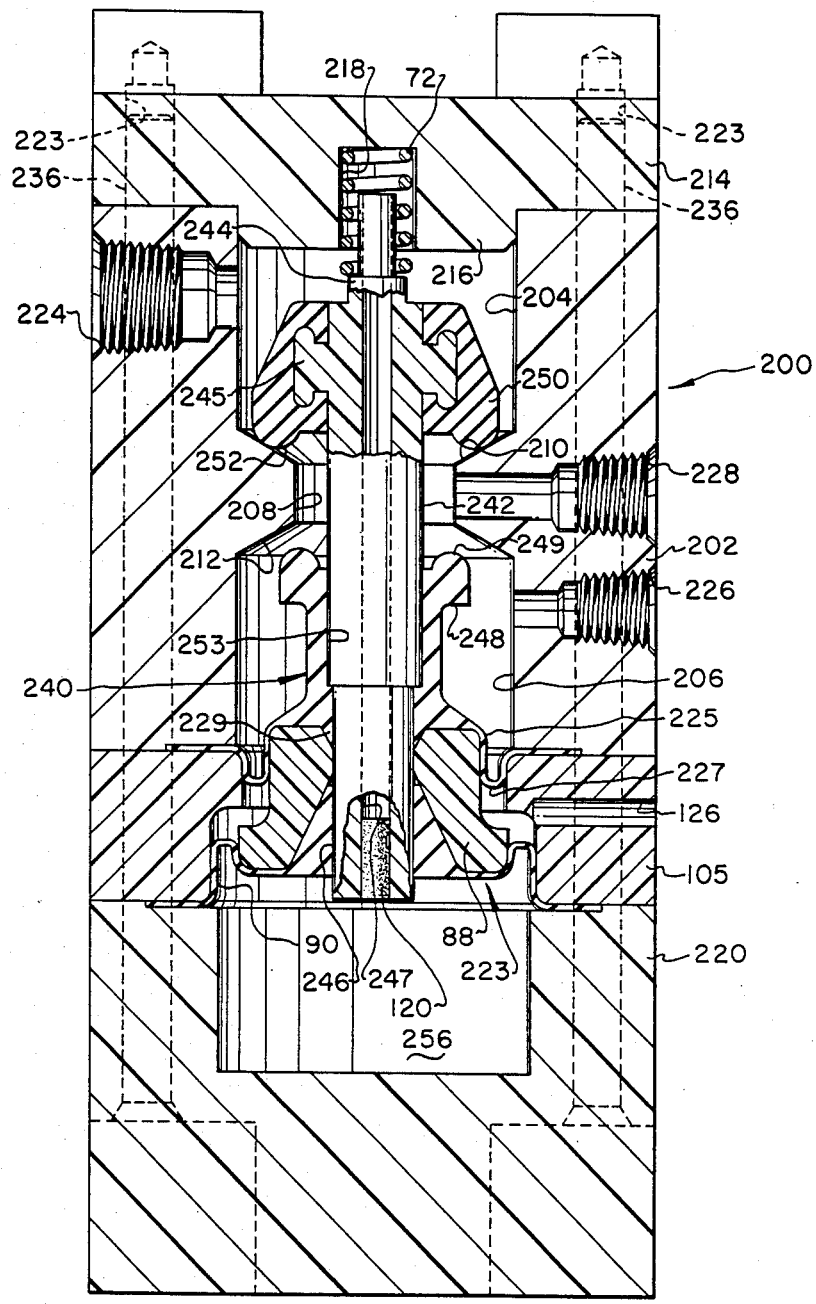
FIG. 4 is a longitudinal central section view of an alternate embodiment of the control valve of the present invention.

Referring now to FIGS. 4 and 5, there is illustrated another embodiment of a control valve in accordance with the present invention and generally designated by the numeral 200. The valve 200 includes a central body part 202 having opposed coaxial bores 204 and 206 which are interconnected by a smaller diameter intermediate bore 208 delimiting opposed conical shaped valve seat surfaces 210 and 212, respectively. One end of the body part 202 is closed by a cover part 214, similar to the cover part 28, and having a cylindrical boss 216 sized to fit snugly in the bore 204. A generally cylindrical recess 218 is formed centrally in the boss 216 and is operable to receive a biasing spring 72. The control valve 200 is also provided with an intermediate body part 105 and a cover part 220, similar to the cover part 106, and providing support for a flexible rolling diaphragm pilot actuator 223 characterized by flexible rolling diaphragm members 225 and 90. The diaphragm 225 is secured between body parts 202 and 105 and includes an annular U shaped wall portion 227 similar to the diaphragm 82 of valve 10. The diaphragm 225 is advantageously formed integral with a valve closure member to be described in further detail herein. The diaphragm 225 is also provided with a conical hub portion 229 cooperable with the hub member 88 to secure the diaphragm on a shaft portion 246 of a closure member shaft 242. The diaphragm 90 is secured on the shaft portion 246 in wedged engagement with the hub member 88 and the diaphragm 90 is also secured around its periphery between the body parts 105 and 220. The body parts 202, and 220 are each provided with respective spaced apart fastener clearance holes 215 and 221, FIG. 5, for receiving threaded screw type fasteners 236, and wherein the body part 214 includes suitable tapped holes 223, FIG. 4, for threadedly engaging the fasteners so that the body parts may be secured together in assembly.

The central body part 202 is provided with three ports 224, 226 and 228. The port 228 opens into the bore 208 between the seat surfaces 210 and 212. The port 224 opens into the bore 204 and the port 226 opens into the bore 206. The valve 200 also includes a closure member, generally designated by the numeral 240, comprising the elongated shaft 242 having a reduced diameter portion 244 at one end and the aforedescribed reduced diameter portion 246 at the opposite end. A cylindrical closure disk 248 is mounted on the shaft 242, is formed integral with the diaphragm 225 and is provided with a curved annular rim 249 which is engageable with the seat surface 212. A second closure disk 250 is integrally molded around a shaft core portion 245 in the same manner as the way in which closure plug 64 is formed around the core 66. The closure disk 250 is provided with a curved annular surface 252 engageable with the seat surface 210. The spacing of the closure disks 248 and 250 on the shaft 242 is such that when one of the closure disks is engaged with its associated seat surface the other disk is suitably spaced from its associated seat surface to provide essentially unrestricted flow through the bore 208 into or out of the either of the bores 204 or 206. In the embodiment of the valve 200 illustrated in FIG. 4 pressure fluid is preferably admitted to pilot actuator chamber 256 from the chamber formed by bore 204 by way of a passage 247 extending through shaft 242 and preferably including a flow restrictor 120 interposed in said passage. Pressure fluid in chamber 256 acts on diaphragm 90 to move the closure disk 248 into engagement with the seat surface 212. In response to venting pressure fluid from the pilot actuator chamber 256, a coil spring 72 is operable to bias the closure disk 250 into engagement with the seat surface 210, as shown by the position of the closure member 240 in FIG. 4.

The effective axial projected area of closure disk 250 which is acted on by pressure fluid in bore 204 to hold the closure disk against seat 210 is predetermined to be less than the opposing effective axial projected area of diaphragm 90 acted on by pressure fluid in chamber 256. Accordingly, with the internally piloted valve embodiment shown, the actuator 223 is always operable to unseat closure disk 250, even when considering the bias force of spring 72. Moreover, the effective axial projected area of closure disk 248 exposed to fluid pressure in the chamber formed by bore 206, when the closure disk is seated against seat 212, is less than the effective axial projected area of closure disk 250 in its seated position. The effective area of closure disk 248 is also less than the effective axial projected area of diaphragm 225 exposed to the chamber formed by bore 206. If port 226 is exposed to pressure fluid, the valve will tend to move to the position shown in FIG. 4 under the urging of pressure fluid forces acting on diaphragm 225 and would require an external source of pilot pressure fluid to be communicated to chamber 256 to shift the closure member 240 to the alternate position. Under such conditions, the flow restrictor 120 would be replaced by a solid plug depending on the quantity of pilot pressure fluid available. The differences in effective closure disk areas of the disks 248 and 250 exposed to pressure fluid in bore 208 would also tend to move valve closure member 240 to unseat the closure disk 250.

Referring briefly to FIG. 5, it will be noted that the body parts 202 and 220 are also provided with axially projecting alignment or locating pins 132. Cooperating bores 134 are formed in the respective opposed mounting faces of the body parts 202 and 214. The body parts 202, 214, and 220 may also be formed of injection molded ABS plastic and without subsequent machining operations expect possibly for providing internal threads in the ports 224, 226 and 228, respectively. The shaft 242 is also preferably fabricated of a plastic material. The closure disks 248 and 250 are also preferably molded of a relatively soft plastic such as neoprene or polyurethane and closure disk 248 is formed with a bore 253 dimensioned to provide for a light force fit on the shaft 242. The closure disk 248 is preferably removable from the shaft 242 so that the valve can be serviced and replacement parts provided without discarding the housing part 202 and the closure member assembly 240.

Although the valves 10, 140 and 200 are configured as basic three way valves those skilled in the art will appreciate that the modular body structure and closure member structure of the control valves of the present invention may be modified to provide a great number of different valve configurations including basic on/off valves, and so called four way valves with the addition of a second closure member axially spaced from and secured to one or the other of the closure members 52 or 240. The lightweight injection molded parts are advantageous in that the valves may be economically fabricated and the inertia of he movable closure members is low thereby providing for fast action of the valves in response to operating forces applied to the closure members. Moreover, the integral molded closure plug and disk portions, being molded of relatively soft plastic such as a polyurethane molding composition or a neoprene type molding composition also provides for a substantially zero leakage type valve.

Although preferred embodiments of the invention have been described herein in detail those skilled in the art will recognize that various substitutions and modifications may be made to the specific structures described without departing from the scope and spirit of the invention as recited in the appended claims.

What I claim is:

1. A pressure fluid control valve having a modular body structure and an axially movable closure member reciprocably disposed in said body structure, comprising:
   a first body part having first and second coaxial bores, and a first seat surface formed at the intersection of said first and second bores;
   a second body part having a third bore and means forming a second seat surface opposite said first seat surface;
   spaced apart fluid conducting ports opening into said first second and third bores, respectively;
   said closure member comprising an elongated shaft and means forming a generally cylindrical closure plug on said shaft and disposed in said first bore and movable to engage said first and second seat surfaces to alternately place said second port in communication with said first and third ports while blocking communication of said second port with the other of said first and third ports; and
   a flexible rolling diaphragm actuator secured to one end of said shaft and to said body structure for supporting said shaft for movement between positions wherein said closure plug is engaged with one of said seat surfaces, said diaphragm actuator comprising a first and second flexible rolling diaphragms each having a hub portion for supporting said diaphragm actuator on said shaft, each of said hub portions having a conically tapered outer surface, a hub member having a pair of opposed outwardly flaring conically tapered surfaces sealingly engaging said conically tapered surfaces of said hub portions of said diaphragms disposed on said shaft in supportive relationship to said first and second diaphragms, and vent means for venting a chamber formed in said body structure between said diaphragms.

2. The control valve set forth in claim 1 wherein: said shaft is supported at the end opposite said diaphragm actuator by actuator means for moving said closure member in at least one direction.

3. The control valve set forth in claim 2 wherein: said body structure includes a first cover part secured to one end of said first body part for supporting said actuator means.

4. The control valve set forth in claim 3 including: a second cover part for securing said diaphragm actuator to said body structure, and fastener means for releasably securing said cover parts and said body parts in assembly to form said body structure.

5. The control valve set forth in claim 4 wherein: said second cover part and said diaphragm actuator form a pilot pressure fluid chamber for urging said diaphragm actuator and said closure member in the other direction in response to pilot pressure fluid being admitted to said pilot chamber.

6. The control valve set forth in claim 5 wherein: said shaft includes passage means in communication with one of said first and third ports for conducting pressure fluid to and from said pilot chamber to effect movement of said closure member.

7. The control valve set forth in claim 6 including:

fluid flow restriction means in said passage means for controlling the rate of flujid flow into said pilot chamber.

8. The control valve set forth in claim 7 wherein:
said flow restriction means comprises a sintered metal plug.

9. The control valve set forth in claim 4 wherein:
said body parts are finish fabricated of molded plastic.

10. The control valve set forth in claim 2 wherein:
said actuator means includes a spring supporting an end of said shaft opposite the end secured to said diaphragm actuator whereby said closure member is supported during movement entirely by said spring and said diaphragm actuator.

11. The control valve set forth in claim 1 wherein:
said means forming said closure plug comprises a resilient molded plastic member molded on said shaft and including opposed annular closure surfaces cooperable with said seat surfaces, respectively.

12. The control valve set forth in claim 1 wherein:
said shaft includes spaced apart circumferential grooves formed in said shaft adjacent respective reduced diameter portions of said shaft, and said means forming said closure plug comprises resilient circular o-ring members removably received in said grooves, respectively.

13. A pressure fluid control valve having a modular body structure, and an axially movable closure member disposed in said body structure comprising a closure plug supported on an elongated shaft, said shaft being disposed in said body structure, said body structure including a central body part forming a chamber and having a first valve seat engageable with one end of said closure plug and a second valve seat engageable with the opposite end of said closure plug, a first working fluid port opening into said chamber, and second and third fluid ports in communication with passage means in said central body part and a second body part, respectively, said closure plug being axially shiftable in said chamber to engage said valve seats to place said working fluid port in communication with one of said second and third ports, respectively, a first cover part secured to said central body part at one end, a differential area diaphragm pilot actuator connected to said shaft and supported by means forming a third body part secured to said second body part, said pilot actuator comprising a first flexible rolling diaphragm including a hub portion having a central opening about said shaft and a conically tapered outer surface, a hub member disposed on said shaft, said hub member having opposed outwardly flaring first and second conical surfaces, said first conically tapered surface of said hub portion of said first diaphragm engaging said first conical surface of said hub member, and a second flexible rolling diaphragm, including a hub portion having a central opening about said shaft and conically tapered outer suface engaging said second conical surface of said hub member, and a second cover part closing the end of said body structure opposite said first cover part and defining with a larger area diaphragm means of said pilot actuator a pilot pressure fluid chamber, and passage means for communicating pressure fluid to said pilot fluid chamber.

14. The control valve set forth in claim 13 wherein:
said passage means for communicating pressure fluid to said pilot fluid chamber extends through said shaft and includes flow restriction means interposed therein for restricting the flow of pressure fluid to said pilot fluid chamber to control the movement of said closure plug.

15. The control valve set forth in claim 13 wherein:
said first and second diaphragms have different projected areas exposed to pressure fluid, the diaphragm having the larger area being exposed to pilot pressure fluid in said pilot fluid chamber.

16. The control valve set forth in claim 13 wherein:
said third body part includes means defining a chamber between said diaphragms and including passage means for venting said chamber between said diaphragms.

17. A pressure fluid control valve comprising:
a first body portion having first and second coaxial bores and a first seat surface formed at the intersection of said first and second bores, said first body portion having spaced apart first and second fluid conducting ports opening into said first and second bores, respectively;
a closure member comprising an elongated shaft and a generally cylindrical closure plug on said shaft disposed in said first bore of said body portion and movable into and out of engagement with said first seat surface;
and a diaphragm actuator including, an actuator body secured to said first body portion, a first flexible rolling diaphragm supported at one end of said actuator body and including a hub portion having a central opening about said shaft and a conically tapered outer surface, a hub member disposed about said shaft and within said actuator body, said hub member including opposed outwardly flaring first and second conical surfaces with said first conically tapered surface of said hub portion of said first diaphragm engaging said first conical surface of said hub member, and a second flexible rolling diaphragm supported at the other end of said actuator body and including a hub portion having a central opening about said shaft and a conically tapered outer surface engaging said second conical surface of said hub member, one of said diaphragms being larger than the other of said diaphragms, said actuator body including vent means between said first and second diaphragms.

18. The pressure fluid control valve as claimed in claim 17, including:
a second body portion having a third bore with a second seat surface opposite said first seat surface, said second body portion including a third fluid conducting port opening into said third bore, said second seat surface being engageable with said closure plug.

19. The pressure fluid control valve as claimed in claim 18, including:
a first cover portion secured to said actuator body to form a pilot pressure chamber.

20. The pressure control valve as claimed in claim 19 wherein:
said shaft includes passage means for conducting fluid pressure to and from said pilot chamber.

21. The pressure control valve as claimed in claim 19, including:
a second cover portion secured to said second body portion.

22. The pressure control valve as claimed in claim 19, including spring means for urging said shaft toward said diaphragm actuator.

* * * * *